United States Patent [19]

Tübke

[11] Patent Number: 5,087,169
[45] Date of Patent: Feb. 11, 1992

[54] PALLETIZING ROBOT

[75] Inventor: Axel B. Tübke, Berlin, Fed. Rep. of Germany

[73] Assignee: System GmbH, Düsseldorf, Fed. Rep. of Germany

[21] Appl. No.: 456,690

[22] Filed: Dec. 28, 1989

[30] Foreign Application Priority Data

Dec. 31, 1988 [DE] Fed. Rep. of Germany ....... 3844502

[51] Int. Cl.$^5$ .............................................. B65G 57/03
[52] U.S. Cl. ............................. 414/792.9; 414/744.3; 414/744.5; 414/796.9; 414/907; 414/926; 901/16
[58] Field of Search ............ 414/792.9, 796.9, 902, 414/907, 926, 744.3, 744.4, 744.6, 744.7, 744.5; 901/8, 39, 16

[56] References Cited

U.S. PATENT DOCUMENTS

| | | |
|---|---|---|
| 3,770,143 | 11/1973 | Breitbach . |
| 4,344,727 | 8/1982 | Chaloupka . |
| 4,383,788 | 5/1983 | Sylvander . |
| 4,630,992 | 12/1986 | Gilli et al. ............... 414/744.6 |
| 4,692,876 | 9/1987 | Tenma et al. ............... 364/513 |
| 4,746,255 | 5/1988 | Roccabianca et al. ...... 414/792.9 X |
| 5,006,036 | 4/1991 | Massmann ................ 414/744.5 |

FOREIGN PATENT DOCUMENTS

| | | |
|---|---|---|
| 0217450 | 4/1987 | European Pat. Off. . |
| 2328659 | 1/1975 | Fed. Rep. of Germany . |
| 2532297 | 1/1977 | Fed. Rep. of Germany . |
| 3102431 | 1/1982 | Fed. Rep. of Germany . |
| 3314204 | 11/1983 | Fed. Rep. of Germany . |
| 3333301 | 3/1985 | Fed. Rep. of Germany . |
| 3151316 | 9/1986 | Fed. Rep. of Germany . |
| 3517955 | 11/1986 | Fed. Rep. of Germany . |
| 3613462 | 10/1987 | Fed. Rep. of Germany . |
| 3718601 | 12/1988 | Fed. Rep. of Germany . |
| 226267 | 8/1985 | German Democratic Rep. . |
| 648806 | 4/1985 | Switzerland ...................... 901/8 |
| 2141397 | 12/1984 | United Kingdom ............... 414/926 |

OTHER PUBLICATIONS f+h report, '86 Kennziffer, p. 347.
"Palettieren-computergesteuert", druckwelt 23-24/10, Dec. 1986, p. 52.

Primary Examiner—David A. Bocci
Assistant Examiner—Janice Krizek
Attorney, Agent, or Firm—Spencer & Frank

[57] ABSTRACT

A palletizing robot for displacing stackable objects, particularly for printed products arranged in stacks, including a gripping device arranged at an arm driven to rotate about a vertical axis, a horizontally oriented transverse member including a track along which the rotatably mounted arm is guided so as to be displaceable in the direction of the transverse member and a bearing rotatable about a vertical axis for the gripping device. The part of the arm extending in the horizontal direction is here disposed below the transverse member and the gripping device is furthermore arranged so as to be vertically displaceable by a predetermined lifting movement, particularly a lifting movement of a few centimeters, in the horizontally extending arm.

10 Claims, 6 Drawing Sheets

PALLETIZING ROBOT

This application is related to the subject matter disclosed in Application Nos. 07/456,683, pending, and 07/456,684, now U.S. Pat. No. 5,042,862, both filed on Dec. 28, 1989.

BACKGROUND OF THE INVENTION

The invention relates to a palletizing for displaying stackable objects, particularly printed products arranged in stacks. The palletizing robot includes a gripping device arranged on an arm that is driven so as to be rotatable about a vertical axis. A horizontally oriented transverse member is provided which includes a track along which the rotatably mounted arm is guided so as to be displaceable along the transverse member. The gripping device is also rotatable about a vertical axis, and a portion of the arm extending in the horizontal direction is disposed below the transverse member.

A palletizing robot for lifting a stack of material from a support, particularly a stack of cut pieces from an intermediate support or a bottom support for use in the tobacco industry is disclosed in German Published Application 3,718,601. The palletizing robot includes a horizontally oriented transverse member including a track provided, by way of an intermediate element, with an arm that is rotatable about a vertically oriented axis and is equipped with a gripping device which is driven to be likewise rotatable about such an axis. A bearing means carries the intermediate element and the arm with the gripping device. This ensures, on the one hand, guidance along the transverse member and, on the other hand, rotation of the arm below the transverse member. The bearing means and the horizontally oriented arm are connected by way of the intermediate element and are each mounted so as to be movable about horizontally oriented axes at the points where they are connected with the intermediate element. The gripper is movable along one translatory axis and about three rotation axes.

The prior art palletizing robot has the drawback that, during the palletizing process, the gripping device is moved about four axes (according to definitions applicable for robot systems). This requires high expenditures for controls and construction and a complicated drive. Moreover, the operating speed of the robot is very slow and therefore the turnover times at the palletizing stations are correspondingly long. Although the palletizing robot is able to compensate for the increasing height of the depositing surface during a stacking palletizing process, the kinematics provided for this purpose make it very slow. This drawback can be overcome according to the prior art only by means of cost intensive measures, such as providing an additional palletizing station or installing accumulation surfaces in the processing or transporting line for the material to be palletized. Moreover, the palletizing robot is weight intensive and is thus subject to great stresses in its joints during the palletizing process. With the desired high operating velocity this leads to an equivalent degree of an increase in susceptibility to malfunction of the palletizing robot. High maintenance costs must therefore be accepted in connection with the prior art palletizing robot.

Furthermore, German Democratic Republic Patent 2,226,267 discloses a device for the manually guided displacement of stackable objects. In this case, a horizontally extendable arm which is rotatable about a vertically oriented axis is articulated by way of a bearing means to a horizontal transverse member. The bearing means is configured so as to be movable in the horizontal direction along the transverse member. The free end of the rotatably mounted arm is further provided with a vertically downwardly extendable lifting element, with a gripping device being mounted to its end so as to be rotatable about a vertically oriented axis. As a whole, the gripping device is thus manually movable along three translatory axes and about two rotation axes.

The device for the manually guided displacement of stackable packets has the drawback that it is unsuitable for automatic palletizing. Manual displacement of the stacks with this device, on the one hand, is too slow and, on the other hand, too wage intensive. Even if it were possible to retrofit this structure for automatic displacement, its drawbacks, such as excess weight of the moving parts and complicated kinematics, would also affect the above-mentioned palletizing robot.

It is the object of the invention to provide, in a palletizing robot of the above-mentioned type, a structure which, with a simplified configuration, permits faster operation while eliminating the above-mentioned drawbacks.

This object and others to become apparent as the specification progresses, are accomplished by the invention, according to which, briefly stated, the palletizing robot includes a substantially horizontal transverse member; a track disposed on and extending along the transverse member; a support bearing slidably disposed on the track; an arm having a first end rotatably attached to the bearing for rotation about a substantially vertical axis, and a second end vertically spaced below the transverse member; a gripping device which is designed for grasping stacked objects and which is pivotally attached to the second end of the arm for rotation about a substantially vertical axis; a guide extending vertically downwardly from the second end of the arm for guiding the gripping device for vertical displacement thereon towards and away from the second end; and a drive for vertically displacing the gripping device on the guide by a predetermined amount.

The invention is based on the realization that, for palletizing or depalletizing of stackable objects, it is possible to significantly increase the palletizing speed by a structure having the least possible number of active joints within the palletizing robot, while retaining a large access range for the robot.

Joints require precise drives and accurately defined arresting positions. In the solution according to the invention, joints that permit bending of the arm have intentionally been avoided. Instead, the arm is made rigid and preferably has a box-shaped aluminum profile.

The sole rotary joint of the rigid arm which rotates about a vertical axis, together with the horizontal displaceability of the rotatably mounted end, permits quick and precise movement of the gripping device over a large operating range. In order to compensate for the different depositing and receiving surfaces created during palletizing or depalletizing by warping or tolerances in the stack heights, the gripping device is configured to be displaceable by a vertical lifting movement of a few centimeters. This lifting movement is realized by a simple vertical auxiliary guide for the gripping device in the gripping arm. The gripping device is shiftable to a fixed extent. Due to its small range of movement, the vertical compensatory movement of the gripping device does not interfere with the high palletizing speed realized by configuring the robot with few joints. Moreover, palletizing and depalletizing always takes place within the same stacking plane, with raising or lowering of the pallet by one stack position at a time taking place after the respective loading or unloading process.

The adjustment range for conveyors and conveying means remains advantageously provided by the transverse member structure. For transporting processes in connection with pallets, it is necessary to be able to operate over the adjustment range of the pallet itself as well as over a feeding or removal range for the material to be stacked and for corresponding devices. The surfaces to be loaded in each case usually have a basically rectangular shape and, for reasons of saving space, are arranged next to one another. Applicable in this connection are, in particular, conveyor belts or processing machines which receive or discharge the conveyed material.

The robot according to the invention, is thus particularly adapted to the palletizing conditions due to its kinematics and particularly also because of the longitudinally displaceable arrangement of the rotatable gripping arm at the transverse member which makes it possible to operate over a broad area. The entire region below the transverse member is available for access. The length of the arm need not be changed since every point within an oval access range can be reached by a different angular position of the arm relative to the transverse member. Within the access range, no zones are left open which could not be adjusted by the robot itself or could not be reached by the gripping arm. The important factor is also that all points of the access region (except for the outermost edge region) are accessible from any direction. This is connected with the advantage that no restrictions exist for loading or unloading of stacks. Particularly in cramped conditions or in connection with special requirements for the insertion or removal direction for the material being transported, multitudinous demands can be met.

The loading and unloading stations may be arranged in any desired juxtaposition so that, due to the short times involved, the transporting times can be further reduced considerably and thus the efficiency of the transporting system is increased compared to similar systems.

The device according to the invention is particularly suitable for the transport of printed products in a collecting folder or in the form of loose or bound-together stacks. In the field of magazine production, all transporting processes around the printing presses and the shipping department can be automated. This includes, in particular, the combination of individual, separately produced parts to be stapled together and the assembly of bundles for shipping. In the combination of parts that were printed at an earlier time with up-to-date portions that are to be included, it is possible to produce a time "buffer" within the production line by supplying a region designated for storage.

In particular, the following advantageous modifications are favorable:

An even larger operating range can be realized if the transverse member is provided with a horizontally displaceable support.

Moreover, in a further embodiment according to the invention, the access times are shortened, in particular, if the rotation angles of gripper arm and/or gripping device are more than 360°, since in that case, successive transporting movements can usually be performed without a complete return rotation as it would otherwise be necessary if a final stop were reached prematurely.

Due to the provision of several parallel tracks on a transverse member, the use of several gripper arms that are controlled in a coordinated manner permits further reduction of turnover times. In this connection, a control unit is preferably provided which blocks coinciding overlaps between gripping regions.

In a preferred embodiment for the stacking of packets of printed products by the palletizing robot, the differences in height caused by the stacking are compensated by platforms, such as lifting tables, which can be raised and lowered so that there is a division of the directions of movement, i.e. the horizontal and vertical movements, between the lifting table and the robot during palletizing and depalletizing. While the palletizing robot palletizes continuously according to a predetermined scheme, the lifting table is lowered by the height of a stack as soon as a layer of stacks has been palletized. Thus, the robot is able to perform the palletizing as quickly as possible with minimum movements. The depalletizing process takes place in a correspondingly reversed direction and sequence. With an average angular movement of the gripping arm, the process from gripping a stack until depositing it takes 1.5 seconds; with the prior art robots, however, it takes 5 seconds. The saving in time has become possible by distributing the tasks of the horizontal and vertical movements to two devices and by the simplified kinematics. Therefore, the control system configuration for the palletizing robot is simplified considerably compared to the prior art embodiments. The lifting table is lowered whenever light barriers which are in operative communication with the lifting table and the packets to be stacked send a signal to the control unit.

It has been found to be particularly favorable for the moving parts of the robot to be made of aluminum and of a light-weight construction. This reduces the mass to be moved and thus the robot's susceptibility to malfunction.

Controlling the palletizing robot according to the invention is enhanced in that a buffer memory of the type of a shift register is provided whose memory locations store movements that are to be performed in succession. If a coinciding overlap of gripping regions occurs and a gripping arm is blocked, the blocked gripping arm is given a task which is scheduled to be performed later. This task is placed ahead in sequence in the buffer memory and is thus performed earlier. Preferably, the individual memory locations are provided with additional identifications regarding the time duration and/or association with individual gripping arms of the movements to be performed.

By means of a control device which includes a memory for different predetermined palletizing schemes, different transporting processes can be performed quickly and flexibly according to a respectively predetermined scheme.

BRIEF DESCRIPTION OF THE DRAWINGS

FIG. 1b is a top plan view of the embodiment of FIG. 1a.

FIG. 3b is a top plan view of the intermediate members of FIG. 3a.

FIG. 5 is a block circuit diagram of a control circuit for the embodiment of FIG. 1a.

DESCRIPTION OF THE PREFERRED EMBODIMENT

Figure 1A:
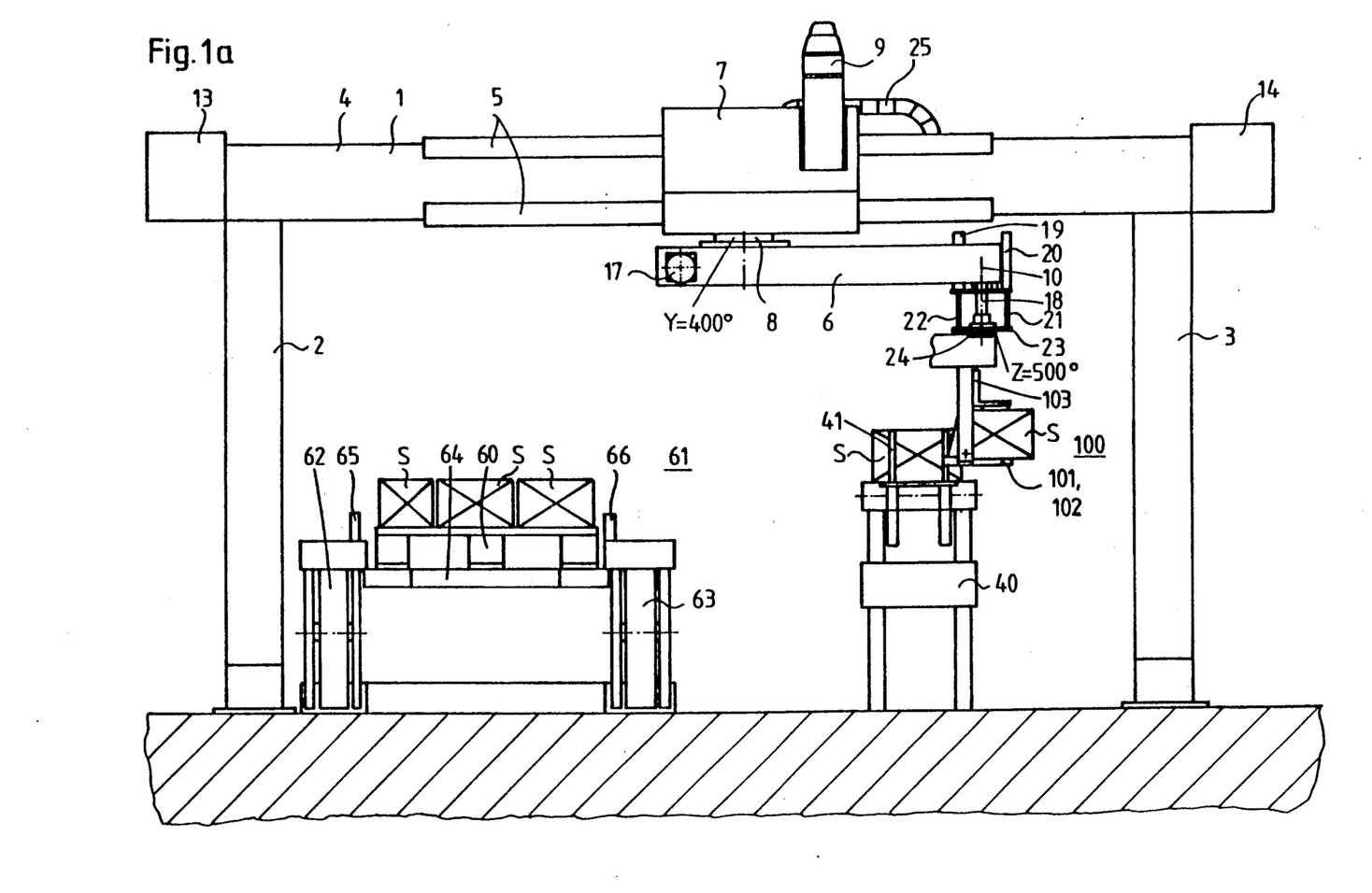
FIG. 1a is a side elevational view of a preferred embodiment of the invention.
Figure 1B:
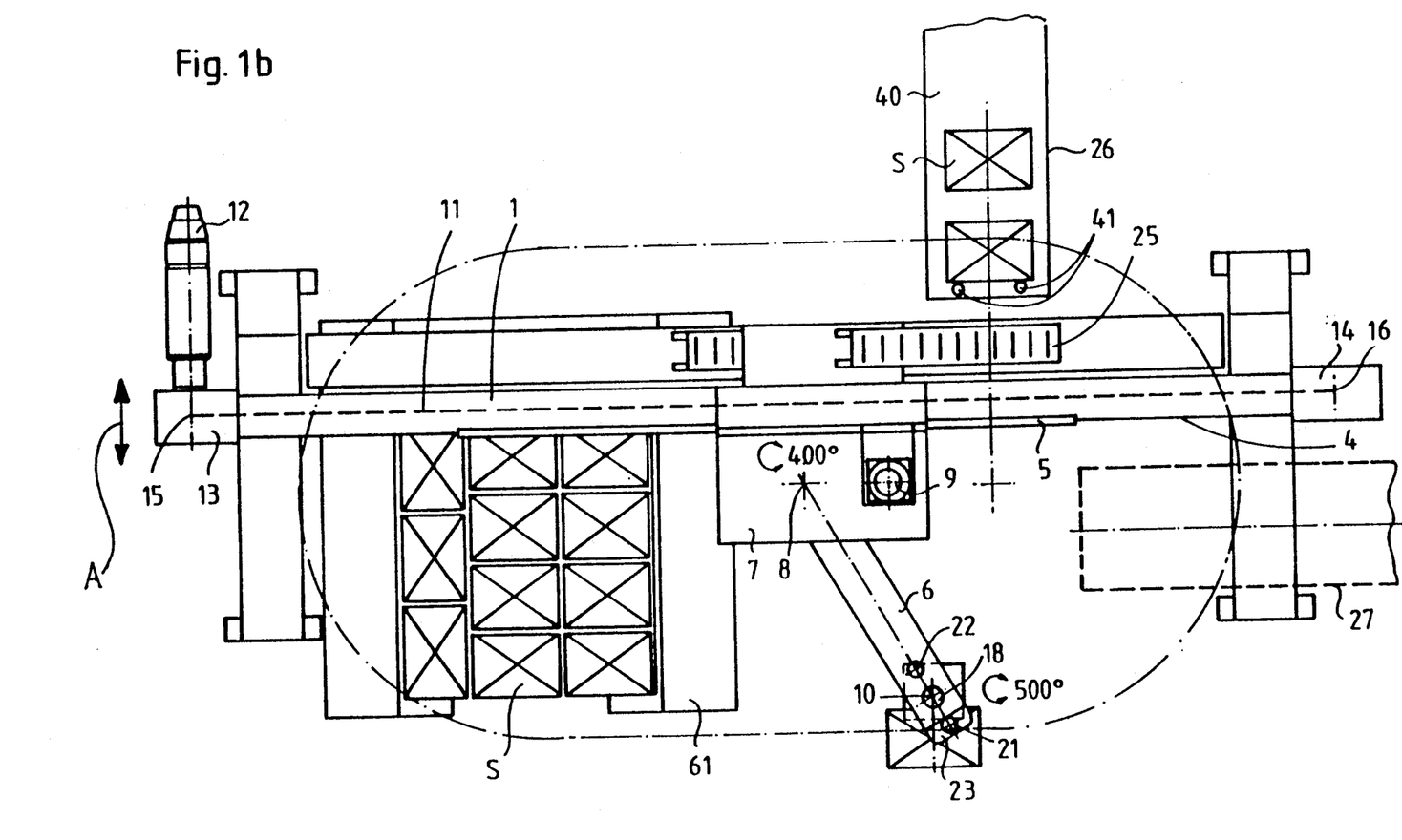

As depicted in the side view and top view, respectively, of the preferred embodiment of the invention shown in FIGS. 1a and 1b, a transverse member 1 extends over the operating range of the device. At its ends, the transverse member 1 is connected with two supports 2 and 3 in the form of stands, with supports 2 and 3 having at least the height of the required processing space.

At one side 4 of transverse member 1, a track 5 is provided which has the length of the lateral displacement path of an arm 6. Arm 6, which is suspended from a rotating device 8 so as to be able to rotate over a rotation angle of 400°, is mounted so as to be displaceable by means of a guiding device 7 in the direction of transverse member 1. Rotating device 8 is driven electrically by means of a motor 9 which is screwed to a housing of guiding device 7.

Guiding device 7 is actuated for a displacement movement in the direction of transverse member 1 by a motor 12 and a toothed belt 11, which is not visible in the drawing but is indicated by dashed lines in FIG. 1b. Toothed belt 11, which extends within transverse member 1, extends from the one drive housing 13 accommodating motor 12 to a drive housing 14 which is connected with transverse member 1 at its opposite end. Toothed belt 11 is trained about a toothed wheel 15 at motor 12 and extends to guiding device 7. Toothed belt 11 is connected with guiding device 7 in such a way that movement of toothed belt 11 causes guiding device 7 to move simultaneously. Following guiding device 7, toothed belt 11 is trained about a reversal roller 16 mounted in drive housing 14, and then the toothed belt 11 extends back to motor 12.

An even larger operating range can be realized if the transverse member 1 is provided with a horizontally displaceable support for movement in the direction indicated by double-headed arrow A.

The free end of arm 6 is provided with a rotating device 10 to which is attached a gripping device 100. Rotating device 10 is driven by a motor 17 which is attached to the side of the arm opposite rotating device 10. The transmission of force from motor 17 to rotating device 10 is effected by way of a further toothed belt. The force is then transmitted further from rotating device 10 by way of a shaft 18 to gripping device 100. The shaft 18 is vertically displaceable by a predetermined amount.

In the vicinity of shaft 18, two lifting rods 21 and 22 are disposed which are associated with two pneumatic cylinders 19 and 20. Pneumatic cylinders 19 and 20 are arranged in parallel and connected with the free end of arm 6. The lifting rods are movable in the direction of gripping device 100. At the ends of lifting rods 21 and 22 opposite pressure cylinders 19 and 20, there is provided a lifting plate 23 which, together with a connecting device 24 of gripping device 100, is connected with shaft 18. The maximum stroke is predetermined by the difference between the retracted position and the maximum extended position of lifting rods 19 and 20.

Guiding device 7, motor 9 and motor 17, as well as the moving device for gripper 100 are linked to the control device by way of a cable strand, with the cable strand being guided in a jointed strip 25 in the transverse member 1.

Due to the few joints in the palletizing robot, the palletizing speed is high while a large access range is maintained. Arm 6 is rigid and is preferably aluminum with a box-shaped profile section.

The single rotating device 8 of rigid arm 6 which rotates about a vertical axis, and together with the horizontal guiding device 7 for the rotatably mounted end of arm 6, permits quick and precise movement of arm 6 together with gripping device 100 over a large range of operation. To compensate for the different deposit and pickup surfaces created by warping or tolerances in the stack heights during palletizing and depalletizing, gripping device 100 is configured so as to be displaceable over a vertical lifting movement of a few centimeters by means of vertically oriented lifting rods 21 and 22. Lifting rods 21 and 22 form a simple auxiliary vertical guide for gripping device 100. Due to the small radius of movement, the vertical compensating movement of gripping device 100 does not adversely influence the high palletizing speed.

FIGS. 1a and 1b show a longitudinal conveyor 40 which supplies a stack S of printed products and which has an abutment device 41 at its end. The conveyor is disposed in the pivot range of arm 6. Gripping device 100 picks up stack S from the end of longitudinal conveyor 40. The lower first tines 101 and 102 then enter into recesses provided in the longitudinal conveyor below stack S which is disposed at the abutment device. Together with second tine 103 which has the configuration of a pressing jaw, the lower two first tines 101 and 102 compress stack S. Then pressure cylinders 19 and 20 move lifting rods 21 and 22 upwardly until the height of abutment device 41 is overcome. In the illustrated embodiment, stack S may be composed of loose or bound stacks of magazines or collecting folders.

The stack is now moved by coordinated movement of guiding device 7, rotating device 8, arm 6, rotating device 10, gripping device 100 and lifting rods 21 and 22 in the direction toward a pallet 60 which is disposed on a lifting table 61 which can be moved vertically by the desired stack height. Lifting table 61 is accordingly located within the maximum displacement and/or rotation range of the palletizing robot.

Lifting table 61 includes a plate 64 vertically movable between stands 62 and 63 and supporting a pallet 60 on which, in turn, are stacks S. Connected with the stands is a light transmitter 65 and light receiver 66 of a light barrier whose light beam traverses the lifting table at the height of the access range of the lower first tines of the gripper. The light beam is reflected at several reversal points and is guided in such a manner that it covers the entire region of the pallet at a maximum beam spacing which is smaller than the smallest transverse dimension of a stack to be monitored. If one layer has been removed, i.e. if during a depalletizing process all conveying processes have been performed for a palletizing pattern, the table is raised by one stack height as a result of signal emitted by the light barrier given that the light path is now unobstructed. During the palletizing process, once one level has been loaded, plate 64 is lowered according to the palletizing pattern until the light path is unobstructed again.

As shown in FIG. 1b, two possible positions 26 and 27 are given for the longitudinal conveyor. The palletizing takes place according to a predetermined scheme which the robot follows successively and deposits the stacks at the predetermined locations. Lifting table 61 moves downwardly by the height of one stack S whenever a layer of stacks S has been deposited on pallet 60. The process is repeated until the pallet load has reached a desired height. Thereafter, the lifting table is lowered completely and deposits the pallet on a DTS (driverless transporting system), not shown here. The DTS transports the pallet out of the processing room and another DTS moves an empty pallet 60 into lifting table 61 and this transporting process, as part of the so-called "palletizing process," begins anew.

The sequence may also be reversed in the course of depalletizing so that stacks S are moved from pallet 60 to a longitudinal conveyor 40. However, as prerequisite of the gripping of stacked material are intermediate members 200 which are described in connection with FIGS. 3a and b.

Figure 2:
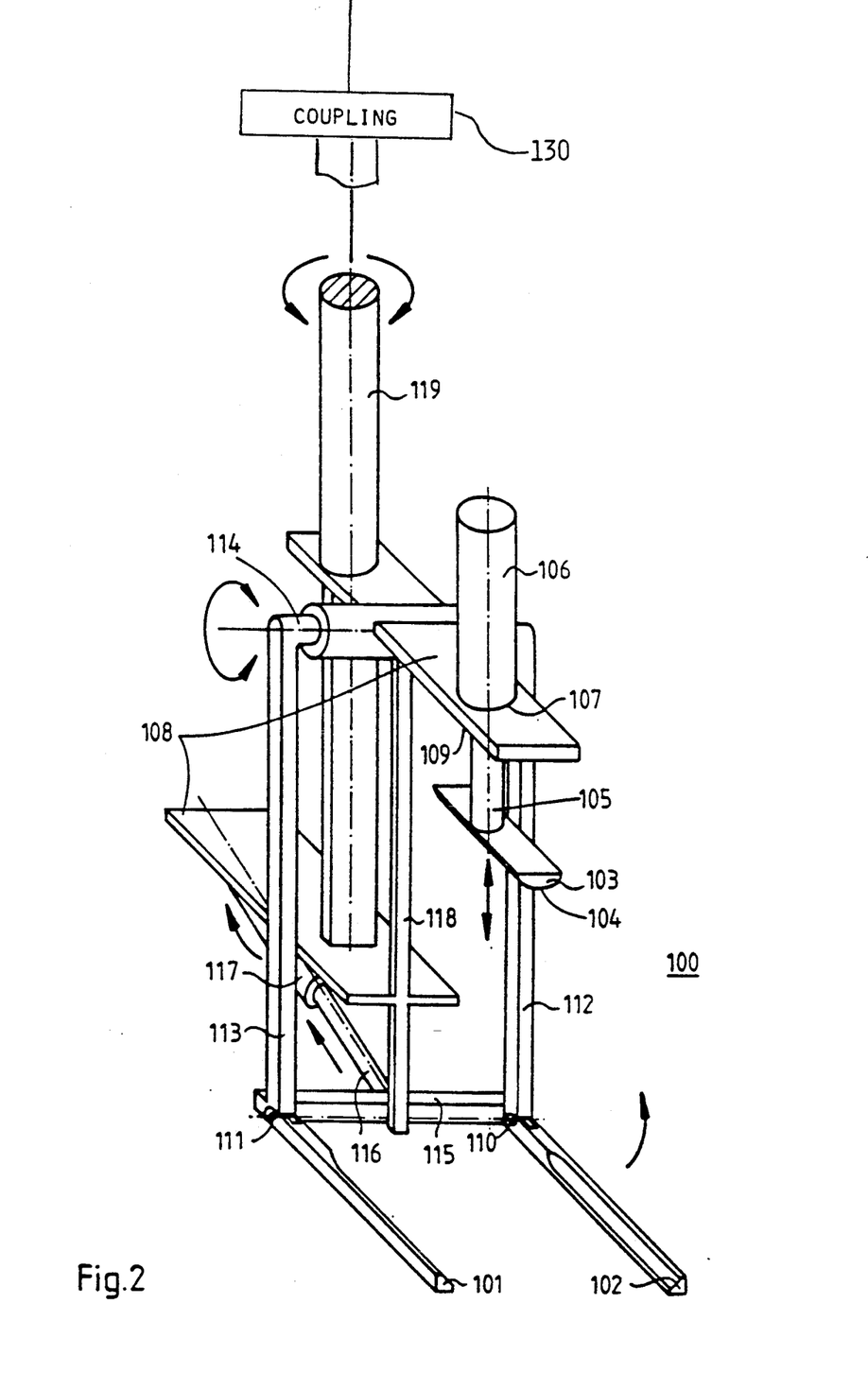
FIG. 2 is a top plan a perspective view of a gripper as a detail on an enlarged scale of the embodiment of FIGS. 1a and 1b.

The gripping device of the preferred embodiment shown in a perspective view in FIG. 2 includes two first tines 101 and 102 arranged at a fixed distance and a second tine 103 which forms a counter-element displaceable relative to the oppositely disposed first tines 101 and 102 in a movement plane disposed in the middle between the two first tines 101 and 102.

The second tine 103 is configured as a pressing jaw so that its contact surface 104 has a convex curvature in the direction of the first tines 101 and 102. On the side opposite the contact surface, the second tine 103 is connected with a push-pull rod 105 which displaceably ends in a pressure cylinder 106. Pressure cylinder 106 is disposed in a recess 107 in a gripper housing 108 and is connected with gripper housing 108 in such a manner that its end face (not visible in FIG. 2) terminates flush with a surface 109 of the gripper housing oriented in the direction toward second tine 103.

The two first tines 101 and 102 are configured as gripper rails having laterally facing surfaces which are sloped in their upper region. The angle of inclination of the slope is configured differently depending on the material to be palletized. Beginning at the hinge joint, tines 101 and 102 are sloped in the direction toward the free end and, from the gripper rail surface oriented toward the second tine, in the direction toward the oppositely disposed gripper strip surface. The two first tines 101 and 102 are connected by way of hinge joints 110 and 111 with the ends of mutually parallel arranged fork rods 112 and 113. Hinge joints 110 and 111 are configured to be foldable within limits so that the two first tines 101 and 102 can be folded only in the direction of the second tine 103. The other ends of fork rods 112 and 113 are connected with one another by way of a bearing rod 114 which extends transversely to fork rods 112 and 113 and which is mounted in the manner of a hinge in gripper housing 108. On the side opposite first tines 101 and 102, in continuation of hinges 110 and 111 of the two first tines 101 and 102, a transverse bar 115 is connected with fork rods 112 and 113. In the middle of transverse bar 115, at a rotatable hinge (not visible in FIG. 2) a lifting rod 116 is disposed. It extends in the direction toward a pressure cylinder 117 disposed at gripper housing 108 and ends displaceably therein. Pressure cylinder 117 is rotatably suspended in gripper housing 108 at a non-illustrated joint.

Between the two fork rods 112 and 113, a stripper 118 is disposed which runs parallel to the axis of movement of second tine 103 and is perpendicular to the plane defined by the two first tines 101 and 102 when they are not folded.

Gripper housing 108 is provided with a connecting rod 119 to which is attached a quick release coupling 103 to a palletizing robot as shown in FIG. 2. Below the coupling, in the direction toward gripper housing 108, connecting rod 119 includes a rotating device (not visible in FIG. 2) for rotation relative to a vertical axis in the center of the connecting rod. Likewise below the coupling, connecting rod 119 is provided with a folding device (also not visible in FIG. 2) for folding relative to a horizontal axis below the rotating device. Thus the gripping device can be rotated through at least 360° and can be folded in the direction of, opposite to and laterally to the free ends of tines 101 to 103. Connecting rod 119 is disposed on the side of gripper housing 108 where pressure cylinder 106 is also disposed, and lies in the plane defined by the second tine 103 during its movement.

The illustration of FIG. 2 shows the movement axes of the gripper. Gripping or releasing of the gripper and thus picking up and depositing of stacks results in the following sequence of movements. The robot moves the gripper to the stack to be gripped in such a way that the first two gripper tines 101 and 102 are disposed below the stack and gripper tine 103 above the stack. The stack then also lies against stripper 118 and is simultaneously centered with respect to the two first tines 101 and 102 and second tine 103.

Then, the gripping device as a whole is raised and simultaneously the second tine 103 is pushed at twice the speed of the stroke of the gripping device, in the direction of the two first tines 101 and 102. Thus tines 101, 102, and 103 simultaneously grip the stack. When a predetermined gripping pressure is reached as well as a predetermined curvature of the stack to stabilize the same, a robot and/or a conveying device move the gripping device to the depositing location.

The gripping device is now turned about a revolute joint of the rotating device (not visible in the drawing) at connecting rod 119 into the desired depositing direction and is moved by way of a lowering movement also transmitted by connecting rod 119 to a predetermined depositing height immediately above the intermediate member 200. Transverse rod 115, together with lifting rod 116 which enters into the pressure cylinder, now swings fork rods 112 and 113 away from the stack into the opposite direction about the axis of bearing rod 114. Thus the underside of the stack is able to be set down completely at the stacking location. In order to prevent damage to the intermediate members by the two first gripper tines 101 and 102 when fork rods 112 and 113 swing back, the two first gripper tines 101 and 102 are folded upwardly about the axis of rotation passing through hinge-like joints 110 and 111.

The gripping device is also able to pick up the stack in a reversed manner in that the gripping device is turned about an axis so that the two first tines 101 and 102 are disposed above the stack and the second tine is disposed below the stack.

Figure 3A:
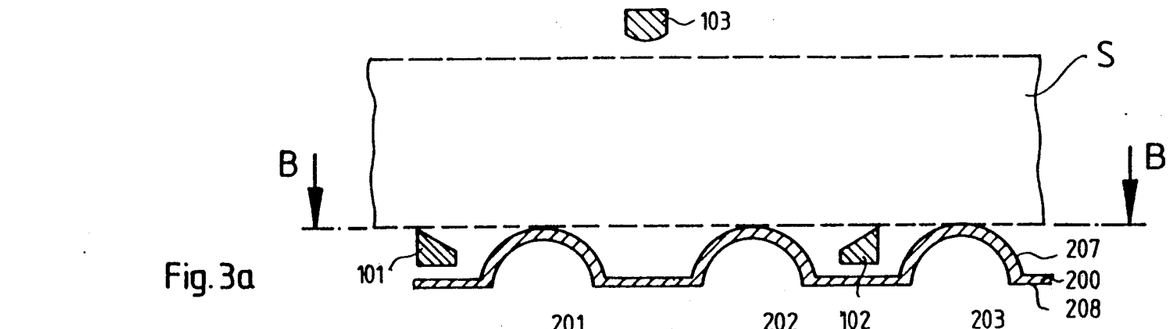
FIG. 3a is a detailed sectional view of intermediate members for the material to be palletized.
Figure 3B:
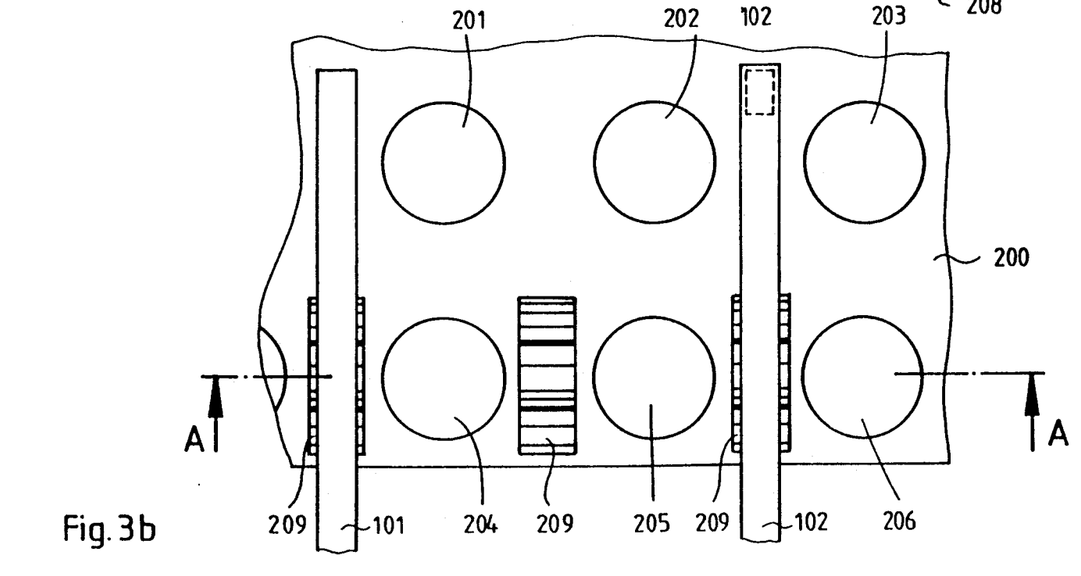

FIGS. 3a and 3b show in a cross-sectional view and in a top view an intermediate member of the embodiment according to the invention. In each case, the intermediate member 200 extends over an entire pallet and forms a support giving the gripper access in order to depalletize the individual stacks. Once an entire position has been cleared, the intermediate member is removed. It can be re-used and is provided, in particular, with the pieces of information or data necessary for access of the gripper, particularly regarding the palletizing pattern, so that depalletizing can be performed automatically as soon as the respective information has been read without the robot having to recognize the positions of the individual stacks. On the other hand, the coding of the intermediate members also provides the palletizing patterns for palletizing so that here again no further control measures are required. Each palletizing pattern merely requires a special type of intermediate members provided with the appropriate coding.

The intermediate member is provided with raised portions 201 to 206, with raised portions 201 to 206 being configured in the shape of nubs. The gripper tines are able to move from the four side edges into the spaces between these nubs. The spacing and height of the nubs is adapted to the gripper tines. Nubs 201 to 206 on the upper side 207 have associated recesses on the underside 208 so that the intermediate members are stackable and nestable. Their surface is smooth so that the intermediate members can be transported by means of suction devices. The upper sides 207 of intermediate members 200 are provided with bar codes 209 in the middle between the nubs. The codes include information about the position of gripping device 100 and the sequence of the palletizing and depalletizing process and are read by a reading device disposed below gripper strip 102 during their entry. If the bar code is readable in the direction of gripper movement, additional drive means to generate a relative movement between the code and the scanning device can be omitted.

For the depalletizing of stacks, the intermediate members are a prerequisite. Tines 101 to 103 of gripping device 100 are moved against the stack in such a way that the two first tines 101 and 102 are disposed below the stack and in the middle between respective nubs and the second tine 103 is disposed above the stack. At the same time, the stack is disposed in the middle between the two first tines 101 and 02 and the second tine 103. The first tines grip underneath the stack S to be depalletized and are able to withdraw freely toward the top from the intermediate member. The intermediate member remains on the support and is removed after a stack layer has been cleared. (The transporting process as a whole takes place according to the palletizing process described in connection with FIG. 1, beginning with picking up the stack to depositing the stack.)

The palletizing and depalletizing process has been illustrated in FIG. 1 between a longitudinal conveyor 40 and a pallet 60. However, the palletizing robot may also serve further stack pick-up and stack deposit positions of different processing machines. Moreover, it may be integrated into different manufacturing, binding and shipping lines. Such a preferred possibility will be described in greater detail below with reference to FIGS. 4a and 4b. The palletizing robot according to the invention supplies and removes from a collecting folder 70 shown here schematically. In the manner described in connection with FIGS. 1, 2 and 3 for stack pickup, the stack is picked up from a pallet 60 (not visible here) equipped with intermediate members 200 between its stack layers, by gripper tines 101 to 103 and is transported, according to FIG. 4a, in a coordinated movement of guiding device 7, rotating device 8, arm 6 and rotating device 10 to the collecting folder 70.

Figure 4A:
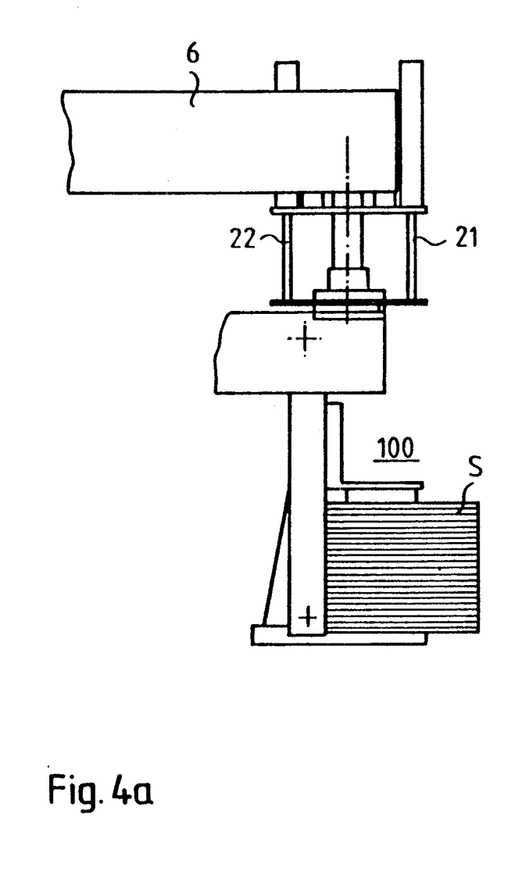
FIG. 4a is the gripper region on an enlarged scale of the embodiment of FIG. 1a in the basic position.

In the collecting folder, the stacks are arranged in a position inclined with respect to the horizontal. Lifting rods 21 and 22 move gripping device 100 in the direction of lifting plate 23 by an amount equal to the amount by which the upper face 71 of the collecting folder lies higher than the upper face of the stack layer. Gripping device 100 is mounted in a folding device 120 so that gripping device 100 is pivotal about a horizontally extending axis 121. Simultaneously with the lifting movement of lifting rods 21 and 22, gripping device 100 is pivoted about a horizontally extending axis 121 in the direction of the sides facing the free ends of the tines into the slope angle of the depository. Then, lifting rods 21 and 22 lower gripping device 100 in the direction toward the collecting folder until the stack rests on the inclined upper face 72 of the collecting folder. Then gripper tines 101 to 103 are released from the stack depository in the manner described in connection with FIG. 1.

Figure 4B:
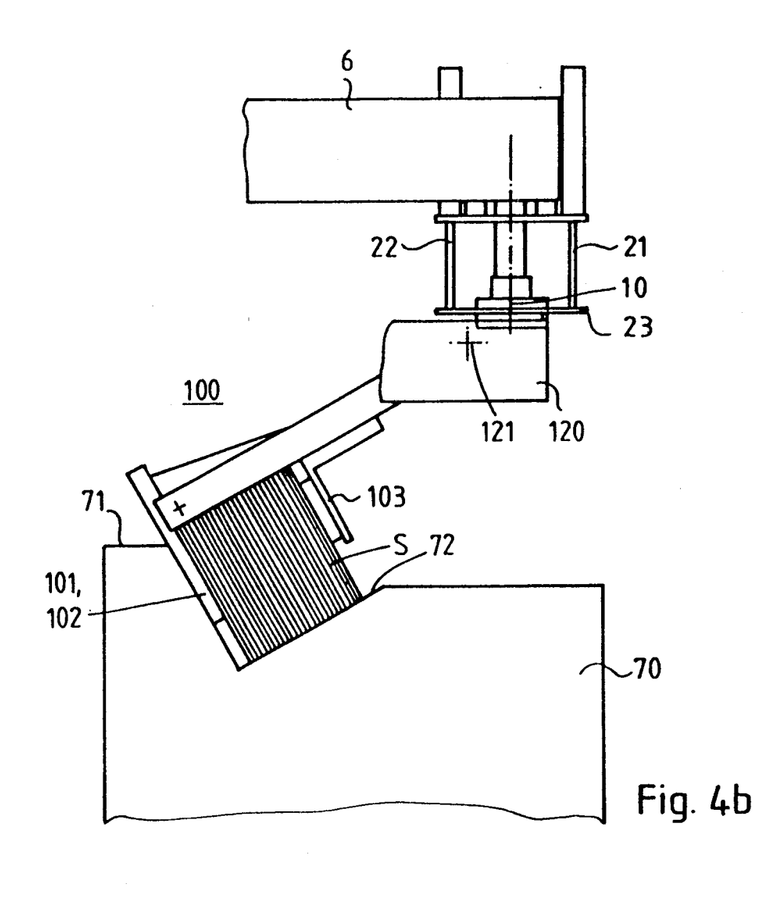
FIG. 4b is the gripper region of FIG. 4a in an inclined position for receiving or depositing a stack.

The collecting folder shown schematically in FIGS. 4a and 4b constitutes merely an example of a depositing or pick-up location for stacks to be transported. The supply into, or the removal from the illustrated, inclined position may preferably also be effected in a fanned manner. The respective depositing or pick-up location is preferably also formed by a so-called crisscross laying device or a pressing station.

Figure 5:
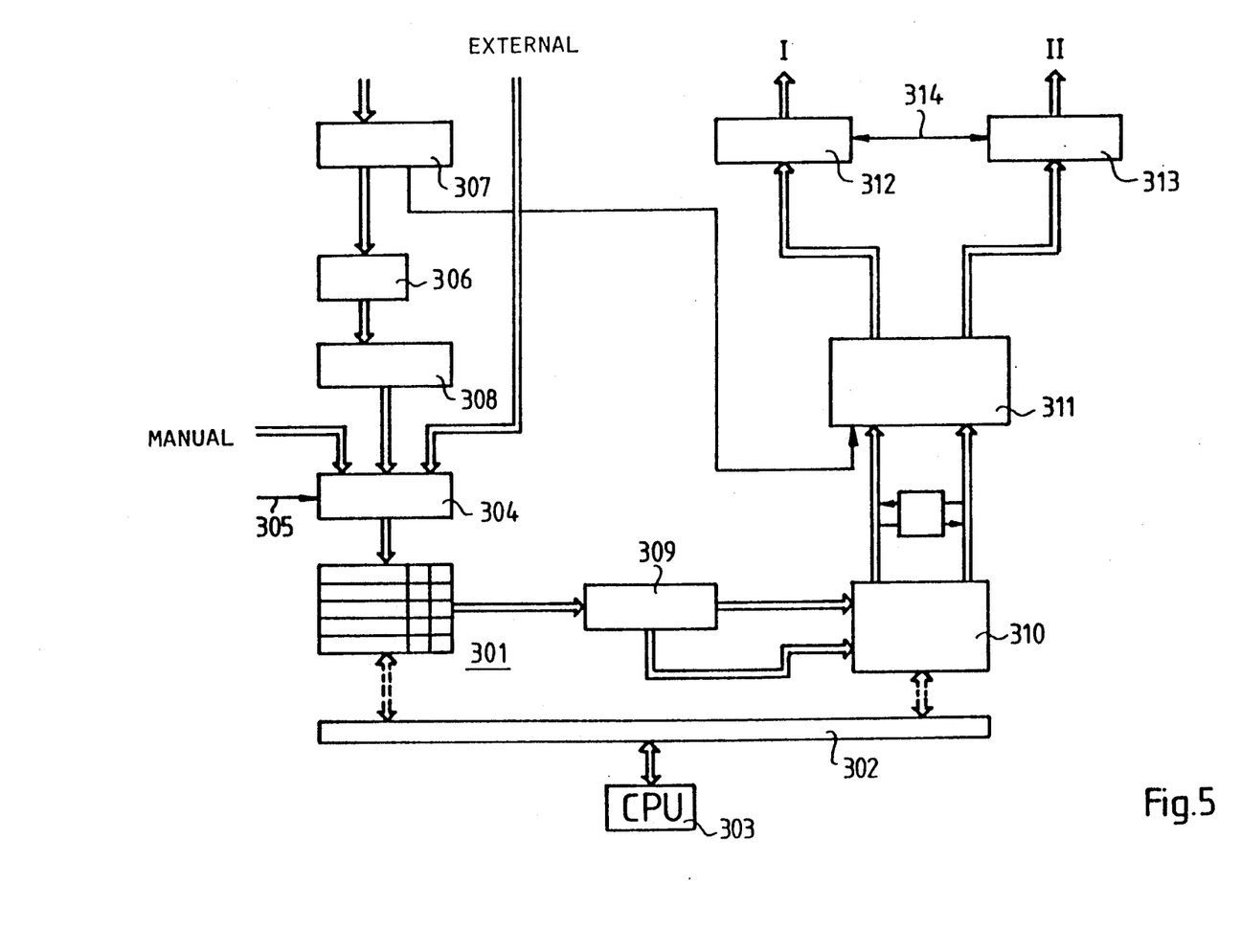

FIG. 5 shows the control of the palletizing robot according to the invention in the form of a block circuit diagram.

In a program memory 301, instructions for complete palletizing and depalletizing processes are stored as a sequence of transporting instructions. Each addressable memory region includes a succession of transporting instructions which are worked off sequentially when the respective memory region is addressed. These instructions include associated pieces of information which are made available by the selection of the access instructions. These pieces of information relate to the time at which the respective transporting instruction is to be performed and in systems, in which several gripper arms can be utilized to perform the same transporting instruction, they serve to detect the association which definitely assigns the respective transporting instruction to a gripper arm or enables the extension of several or all gripper arms so that optimum speed can be realized by exchanging tasks. The individual regions for the instruction sequences are illustrated symbolically by boxes in the block circuit diagram of memory 301. The associated pieces of information (small squares) are shown for each one of the instruction sequences shown vertically above one another in the form of rectangles. However, physically each individually addressable instruction sequence is composed of a sequence of instructions which are individually associated with the respective pieces of information.

Each instruction sequence is thus also associated with a palletizing scheme which, in its sequence of transporting instructions, give information about the distribution of the material on the pallet during palletizing as well as during depalletizing. In this way, it is always possible—independently of the size and number of the stacks to be loaded—to obtain uniform packages which, in particular, go to the edges of the pallets so that a stable stack is produced. The same applies for the supply or removal of merchandise in production and storage regions.

By way of a bus 302, memory 301 is connected in a microprocessor or other computer system with a CPU 303. The CPU performs the data transfers to be described below. For the sake of clarity, the respective connecting paths are shown directly in FIG. 5. In a programmable memory system, the respective data exchange, however, is also actuated by CPU 303 via bus 302.

The memory is addressed by way of a selector switch 304 which is equipped with various inputs that can be manually selected by way of an actuating element 305. In this connection, manual address input (left input channel) is initially possible in order to predetermine palletizing patterns for depalletizing or palletizing processes by way of direct switch actuation. Correspondingly, a remote input by remote data processing means or by a higher-order central system is possible through the right input channel.

The middle input channel is controlled by a code reader 306 having an associated scanner 307 which is connected with the gripper arm or its tines and which reads the code provided at a pallet or at an intermediate member and feeds it via a code address converter 308 to memory 301 for decoding the detected codes and output of the address of the associated instruction sequence. In this way, detection of the code results in the automatic selection of a corresponding transporting scheme which is forwarded via a buffer 309 to a block 310 for path optimization. The control signals for two grippers reach a "path guidance" block 311 which converts the individual transporting instructions into concrete control instructions for movement of the arms and gripper components. A first gripper I and a second gripper II are connected with path guidance block 311 by way of corresponding actuation circuits 312 and 313.

In order to coordinate and secure the gripper movements, a lock 314 is initially actuated so as to block coinciding overlapping of the gripper movements. A second gripper arm entering the range of movement during the performance of a transporting instruction is blocked until the first gripper has left the region. With this safety control it is possible to easily coordinate the movements of several grippers. However, in order to also produce time optimization, a "preview" feature is favorable which includes future gripper movements. Since the gripper movements each take place according to a predetermined scheme, during the performance of a momentary transporting instruction, the next instructions in the series are already loaded into buffer 309 which contains a separate shift register for each gripper, with their individual memory positions being separately address-able and changeable. Thus, this is a shift register whose characteristics go beyond those of corresponding commercially available integrated registers and is therefore realized in programmable-memory form.

Under consideration of the processing time information belonging to the individual transporting instructions, the overlap during future transporting instructions is calculated and, if such overlap is determined, a later instruction during which no overlapping takes place is given priority. For this, a further supplemental piece of information stored in connection with a transporting instruction must also be evaluated. It indicates the maximum number of steps by which a respective transporting step can be given priority to be performable. This may also include further conditions which may be important for processing. In practice, it will be easily possible during palletizing or depalletizing to give priority to a transporting instruction which relates to a stack that is included in the row presently being worked. In the coordinated performance of transporting tasks by two or more gripper arms, tasks of the one arm may be transferred to the other arm in order to be able to compensate for favored time slots for one or the other arm occurring within the scope of the optimization process. For this purpose, those supplemental informations are evaluated which relate to the association of the performance of transporting instructions by the one or the other arm.

It will be understood that the above description of the present invention is susceptible to various modifications, changes and adaptations, and the same are intended to be comprehended within the meaning and range of equivalents of the appended claims.

The present invention is not limited in its embodiments to the above-described preferred embodiment. Rather, a number of variations are conceivable which take advantage of the described solution even for basically different configurations.

I claim:

1. A palletizing robot for moving stacked objects, comprising:
    a substantially horizontal transverse member;
    a track means disposed on and extending along said transverse member;
    a support bearing means slidably disposed on said track means;
    an arm having first and second ends, said first end being rotatably attached to said bearing means for rotation about a substantially vertical axis, and said second end being vertically spaced below said transverse member;
    a gripping device for grasping stacked objects; said gripping device being pivotally attached to said second end of said arm for rotation about a substantially vertical axis;
    a guide means extending vertically downwardly from said second end of said arm for guiding said gripping device for vertical displacement thereon towards and away from said second end; and
    means for vertically displacing said gripping device on said guide means by a predetermined amount.

2. A palletizing robot as defined in claim 1, wherein said transverse member is horizontally displaceable.

3. A palletizing robot as defined in claim 1, further comprising means for rotating at least one of said arm and said gripping device through a rotation angle greater than 360°.

4. A palletizing robot as defined in claim 1, further comprising a control unit for coordinating picking up and stacking of objects by said gripping device.

5. A palletizing robot as defined in claim 4, wherein said control unit comprises a memory for storing a predetermined palletizing scheme for palletizing stacked objects.

6. A palletizing robot as defined in claim 4, further comprising a vertically movable lifting table for receiving a plurality of layers of stacked objects thereon.

7. A palletizing robot as defined in claim 6, wherein said control unit comprises a light barrier means for detecting a presence or an absence of a layer of stacked objects received on said lifting table, said control unit causing said lifting table to be raised by a predetermined amount when said light barrier detects and unobstructed passage of light during the removal of stacked objects, and said control unit causing said lifting table to be lowered by a predetermined amount when said light barrier fails to detect light during the addition of stacked objects stacks, whereby said control device layer ensures the removal and production of layers of stacked objects according to a predetermined scheme.

8. A palletizing robot as defined in claim 7, wherein said light barrier means comprises one of a light receiver and a plurality of light receivers linked together by an OR circuit; further wherein said light barrier means comprises a plurality of light sources for emitting a plurality of beams adjacent a surface of said lifting table, the spacing between adjacent ones of said beams being less than an edge length of a layer of stackable objects to be received on said table, and said plurality of beams is directed at one of said light receiver or said plurality of light receivers.

9. A palletizing robot as defined in claim 1, wherein said gripping device includes a quick release coupling.

10. A palletizing robot as defined in claim 1, wherein said arm is a member of elongated box shape.

* * * * *